United States Patent
Brockway et al.

(10) Patent No.: US 11,148,237 B1
(45) Date of Patent: Oct. 19, 2021

(54) INSTALLATION TOOL ASSEMBLY, A TOOLING ASSEMBLY FOR A WORKPIECE, AND A METHOD

(71) Applicant: The Boeing Company, Chicago, IL (US)

(72) Inventors: Monica J. Brockway, Bothell, WA (US); Farahnaz Sisco, Mukilteo, WA (US); Mekonnen Tsegga, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/830,582

(22) Filed: Mar. 26, 2020

(51) Int. Cl.
| | | |
|---|---|---|
| *B25B 23/10* | (2006.01) | |
| *B23P 9/02* | (2006.01) | |
| *F16B 4/00* | (2006.01) | |

(52) U.S. Cl.
CPC .............. *B23P 9/02* (2013.01); *B25B 23/103* (2013.01); *F16B 4/004* (2013.01)

(58) Field of Classification Search
CPC ....... B23P 9/02; B25B 23/103; B25B 27/023; B25B 29/02; F16B 4/004; F16B 33/06
See application file for complete search history.

(56) References Cited

U.S. PATENT DOCUMENTS

| | | | | |
|---|---|---|---|---|
| 5,439,339 A | * | 8/1995 | Batchelor | F16B 4/004 411/361 |
| 6,574,843 B1 | * | 6/2003 | Meadows | B25B 27/24 29/221.5 |
| 7,373,709 B2 | * | 5/2008 | Fernando | B25B 13/48 29/243 |
| 2003/0188410 A1 | * | 10/2003 | English | B25B 27/023 29/263 |
| 2003/0219328 A1 | * | 11/2003 | Schultz | F16B 33/06 411/378 |
| 2018/0023939 A1 | * | 1/2018 | Hicks | B23P 19/10 33/645 |
| 2019/0015959 A1 | * | 1/2019 | Strange | B25B 29/02 |

* cited by examiner

*Primary Examiner* — Lee A Holly
(74) *Attorney, Agent, or Firm* — Quinn IP Law (57) ABSTRACT

An installation tool assembly includes a workpiece and a tool. The workpiece includes a first wall having an aperture and a second wall spaced from the first wall relative to a first axis to present an access point therebetween. The installation tool assembly includes a fastener disposed in the aperture of the first wall at an initial position. The fastener includes a hole and a fastener locking feature disposed inside the hole. The tool includes a tool locking feature that is configured to engage the fastener locking feature to secure together the fastener and the tool in the initial position. The tool is operable to pull the fastener farther through the aperture into an interference fit with the first wall in an installed position. A tooling assembly includes the tool and the fastener. A method of installing the fastener to the workpiece uses the tool.

20 Claims, 4 Drawing Sheets

INSTALLATION TOOL ASSEMBLY, A TOOLING ASSEMBLY FOR A WORKPIECE, AND A METHOD

BACKGROUND

During assembly of a workpiece, the orientation of the workpiece may present limited access to attach a fastener to various components of the workpiece. For example, the workpiece may include a hole along a central axis, and a wall that angles toward the central axis to present a small access space that a pull-in type of tool cannot access to pull the fastener into the hole from the small access space. This pull-in type of tool cannot access the hole axially along the central axis due to the angle of the wall, and also cannot be rocked into place either due to the small access space.

SUMMARY

Therefore, there is a need for a tool that is accessible to a small space created via a workpiece, and designed to pull a fastener into an aperture of the workpiece from the small space.

The present disclosure provides an installation tool assembly including a workpiece and a tool. The workpiece includes a first wall having an aperture disposed along a first axis. The workpiece includes a second wall spaced from the first wall relative to the first axis to present an access point between the first wall and the second wall. The installation tool assembly also includes a fastener disposed in the aperture of the first wall at an initial position. The fastener includes a hole and a fastener locking feature disposed inside the hole. The tool is movable into the access point transverse to the first axis to position the tool relative to the fastener. The tool includes a tool locking feature that is configured to engage the fastener locking feature to secure together the fastener and the tool in the initial position. The tool is operable to pull the fastener farther through the aperture into an interference fit with the first wall in an installed position.

The present disclosure also provides a tooling assembly for a workpiece. The workpiece includes an aperture disposed along a first axis and an access point to the aperture. The tooling assembly includes a fastener disposed in the aperture of the workpiece at an initial position. The fastener includes a hole and a fastener locking feature disposed inside the hole. The tooling assembly also includes a tool movable into the access point transverse to the first axis to position the tool relative to the fastener. The tool includes a tool locking feature that is configured to engage the fastener locking feature to secure together the fastener and the tool in the initial position. The tool is operable to pull the fastener farther through the aperture into an interference fit with the workpiece in an installed position.

The present disclosure further provides a method of installing a fastener to a workpiece. The workpiece includes a first wall and a second wall spaced from each other to define an access point. The fastener is inserted into an aperture of the first wall at an initial position. The aperture is disposed along a first axis. A tool is inserted into the access point transverse to the first axis. A fastener locking feature of the fastener and a tool locking feature of the tool are secured together when the fastener is in the initial position. A torque is applied to the tool which pulls the fastener axially along the first axis farther through the aperture into an interference fit with the first wall in an installed position.

The detailed description and the drawings or figures are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Referring to the figures, wherein like numerals indicate like or corresponding parts throughout the several views, operation of an installation tool assembly 10 is generally shown in FIGS. 1-5. As will be discussed further below, the installation tool assembly 10 is used in limited or difficult access situations where it is desirable to pull a fastener 12 into a desired position.

Referring to FIGS. 1-5, the installation tool assembly 10 includes a workpiece 14 and a tool 16 that is used with the workpiece 14 during various assembly operations. The tool 16 is configured to have a low outer profile to access a space 18 of the workpiece 14 that is difficult to access. The workpiece 14 may be contoured to allow limited access to this space 18, and thus, the size of the space 18 limits the size of the tool 16 that can access this space 18.

For example, as shown in FIGS. 1-5, part of the workpiece 14 may include a wall 20A, 20B that has an angled portion 22 relative to a first axis 24 which prevents the tool 16 from entering the space 18 axially relative to the first axis 24. As another example, the wall 20A, 20B may include a back portion 26 that closes the space 18 transverse to the first axis 24. The angled portion 22 and the back portion 26 limit accessibility of the space 18.

Continuing with FIGS. 1-5, the workpiece 14 includes an aperture 28 disposed along the first axis 24, and the workpiece 14 includes an access point 30 (the access point 30 is identified in FIG. 1) to the aperture 28. The workpiece 14 includes a first wall 20A and a second wall 20B spaced from the first wall 20A relative to the first axis 24 to present the access point 30 between the first wall 20A and the second wall 20B. Generally, the first wall 20A and/or the second wall 20B may be the wall 20A, 20B that has the angled portion 22 and/or the back portion 26.

The orientation of the first wall 20A and the second wall 20B present the limited access to the space 18. Therefore, the tool 16 is designed to be compact and have the low outer profile to enter this space 18. Generally, the tool 16 enters the access point 30 transverse to the first axis 24. For illustrative purposes, when referring to the orientation of the workpiece 14 in FIGS. 1-5, the tool 16 enters the access point 30 into the page or out of the page. As another example, for illustrative purposes, when referring to the orientation of the workpiece 14 in FIGS. 1-5, the tool 16 enters the access point 30 from below the space 18. In other words, the tool 16 does not enter the access point 30 axially along the first axis 24 behind the second wall 20B.

The workpiece 14 may be any suitable configuration, and non-limiting examples may include one or more panels, sheets, frames, beams, brackets, closed angles, box structures, window frames, wings of an aircraft, etc. Furthermore, the workpiece 14 may be used in any suitable structure/architecture, and non-limiting examples may include an aircraft, a vehicle, a watercraft, a stationary unit, a robot, a powerplant, a movable platform, a building, a consumer product, an infrastructure, etc. In addition, as suggested above, the workpiece 14 may include a plurality of components as shown in FIGS. 1-5 fastened together.

For example, the workpiece 14 may include the first wall 20A and the second wall 20B, a third wall, etc., depending on the desired number of the plurality of components to be fastened together via the fastener 12. Any one or more of the first wall 20A, the second wall 20B, the third wall, etc., may have the angled portion 22 fixed thereto. The angled portion 22 may be integral with the first wall 20A, the second wall 20B, the third wall, etc. or the angled portion 22 may be a separate piece attached to the first wall 20A, the second wall 20B, the third wall, etc. For illustrative purposes for the below discussion, the second wall 20B has the angled portion 22 and/or the back portion 26. Furthermore, for illustrative purposes when referring to FIGS. 1-5, the second wall 20B may also include a front portion spaced from the back portion 26, and the front portion may abut the first wall 20A; and additionally, the aperture 28 may be disposed through the front portion of the second wall 20B.

Figure 1:
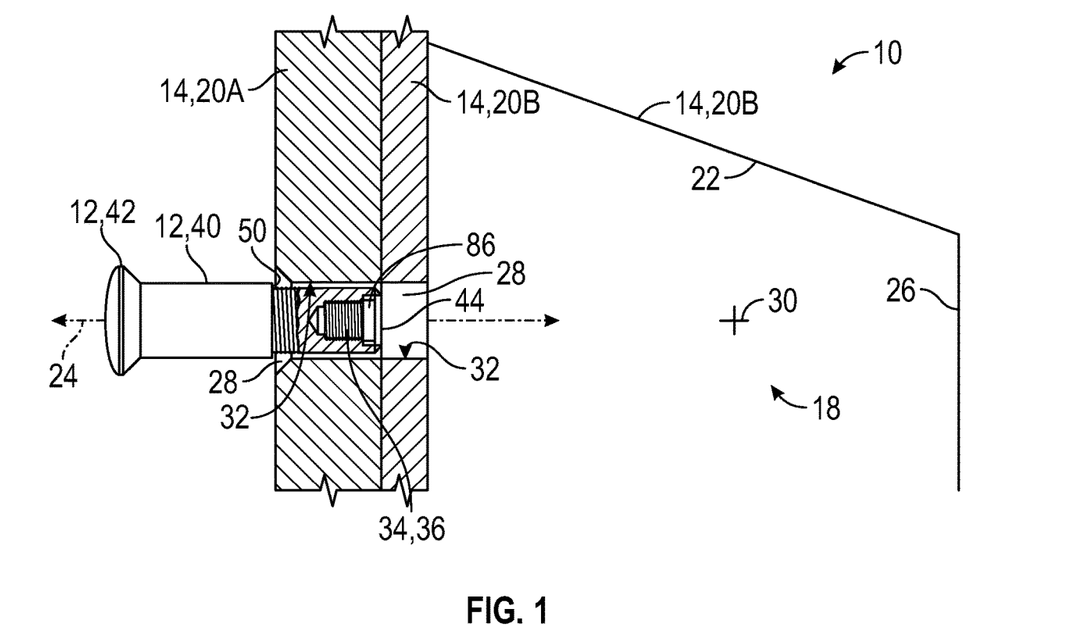
FIG. 1 is a schematic illustration of a workpiece and a fastener disposed in an aperture of the workpiece in an initial position.

Continuing with FIGS. 1-5, in certain configurations, the first wall 20A of the workpiece 14 has the aperture 28 disposed along the first axis 24. Generally, a surface 32 of the workpiece 14 defines a boundary of the aperture 28. The aperture 28 may be completely through the workpiece 14. Therefore, the aperture 28 may be disposed through the first wall 20A and the second wall 20B of the workpiece 14 along the first axis 24, as best shown in FIG. 1. As such, the surface 32 of the workpiece 14 may be defined via the first wall 20A and the second wall 20B. The fastener 12 is used to secure, or attach together, the first wall 20A and the second wall 20B, as discussed in detail below.

To begin the installation process, the fastener 12 is placed into the workpiece 14. Therefore, referring to FIG. 1, the installation tool assembly 10 further includes the fastener 12 disposed in the workpiece 14 at an initial position. More specifically, in certain configurations, the fastener 12 is disposed in the aperture 28 of the first wall 20A at the initial position. In certain configurations, the fastener 12 may be loosely disposed in the aperture 28 of the workpiece 14 when the fastener 12 is in the initial position. In other configurations, the fastener 12 is tapped into the aperture 28 of the workpiece 14 when the fastener 12 is in the initial position to prevent the fastener 12 from backing out of the aperture 28 as the tool 16 is being attached to the fastener 12. Therefore, an installer or robot may place the fastener 12 into the aperture 28 in the initial position.

Figure 6:
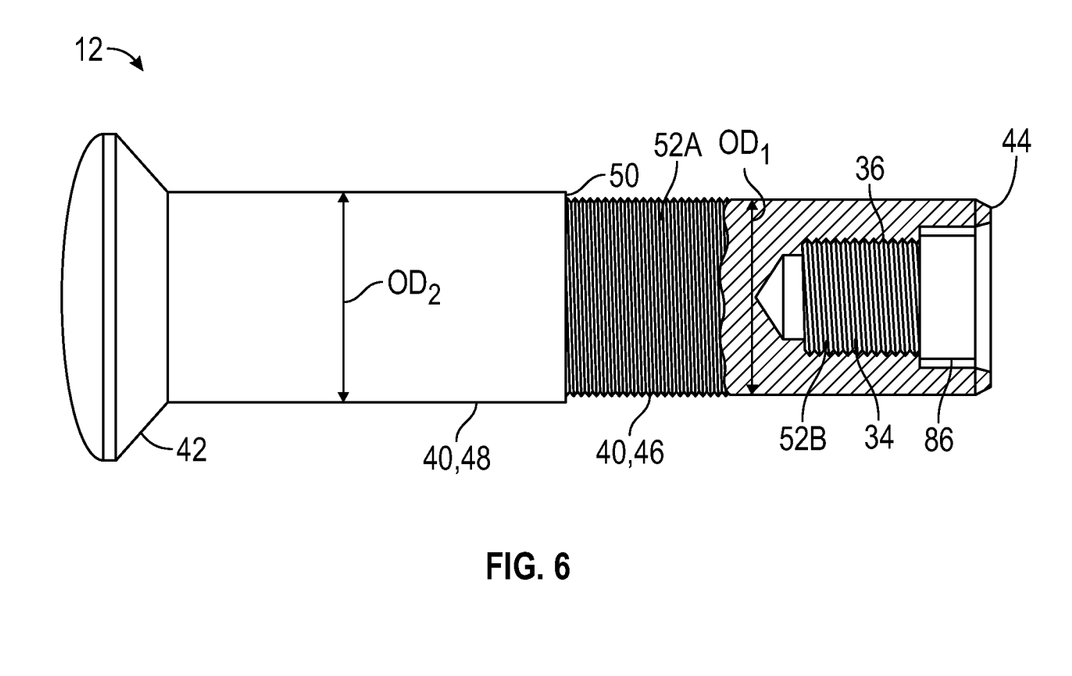
FIG. 6 is a schematic partial cross-sectional view of the fastener illustrated in FIGS. 1-5.
Figure 7:
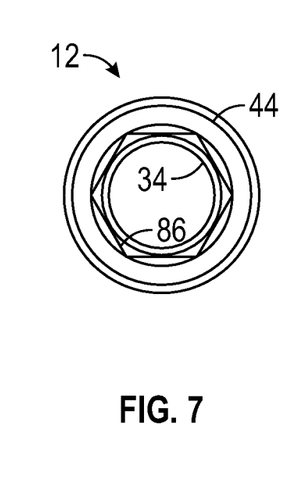
FIG. 7 is a schematic end view of the fastener of FIG. 6.

As best shown in FIGS. 6 and 7, the fastener 12 includes a hole 34 and a fastener locking feature 36 disposed inside the hole 34. When using the tool 16, the tool 16 engages the fastener locking feature 36 to pull the fastener 12 farther into the aperture 28. As will be discussed further below, the tool 16 is operable to pull the fastener 12 farther through the aperture 28 into an interference fit with the workpiece 14 in an installed position. The present disclosure also provides a tooling assembly 38 for the workpiece 14, in which the tooling assembly 38 includes the fastener 12 and the tool 16 as described herein.

Turning to FIG. 6, the fastener 12 may include a body portion 40 and a head portion 42 that protrudes from the body portion 40. The head portion 42 prevents the fastener 12 from being pulled completely through the aperture 28 during the installation process. The body portion 40 provides the interference fit when the fastener 12 is in the installed position.

The body portion 40 of the fastener 12 may include a distal end 44 spaced from the head portion 42, and in certain configurations, the hole 34 is disposed through the distal end 44. Therefore, the hole 34 is open at the distal end 44. As shown in FIG. 1, when the body portion 40 is disposed in the aperture 28 at the initial position, the head portion 42 is spaced from the first wall 20A.

Turning back to FIG. 6, the body portion 40 may include a first segment 46 having a first outer diameter $OD_1$ and a second segment 48 having a second outer diameter $OD_2$ greater than the first outer diameter $OD_1$ to present a transition shoulder 50 between the first segment 46 and the second segment 48. The first segment 46 may include the distal end 44 having the hole 34, and the second segment 48 is disposed between the head portion 42 and the transition shoulder 50. The first segment 46 of the fastener 12 is easily positioned inside the aperture 28 in the initial position, and the second segment 48 provides the interference fit when the fastener 12 is in the installed position. The transition shoulder 50 may act as a lead-in as the fastener 12 is pulled from the initial position farther into the aperture 28 to the installed position. It is to be appreciated that the transition shoulder 50 may be angled, tapered, flat, or any other suitable configuration/orientation.

As mentioned above, the first segment 46 of the body portion 40 is disposed in the aperture 28 when the fastener 12 is in the initial position. The first segment 46 of the body portion 40 may include threads 52A, which is used in a final installment process. It is to be appreciated that the threads 52A of the first segment 46 of the body portion 40 may include right-handed screw threads or left-handed screw threads. For illustrative purposes, the first segment 46 of the fastener 12 in FIGS. 1-6 illustrate the threads 52A up to the broken line of the fastener 12 in order to illustrate other features inside of the fastener 12; therefore, it is to be appreciated that the threads 52A of the first segment 46 may extend along more of the first segment 46 than is illustrated.

A nut or collar is secured to the threads 52A of the first segment 46 in the final installment process. Once the nut/collar is secured to the fastener 12, the first wall 20A and the second wall 20B are secured together. The nut/collar may have threads or annular rings, or any other suitable structure(s) to secure the nut/collar to the first segment 46 of the fastener 12.

While the fastener 12 is in the initial position, the tool 16 is movable into the access point 30 transverse to the first axis 24 to position the tool 16 relative to the fastener 12. In this position, prior to securing the tool 16 to the fastener 12, the first wall 20A is disposed between the head portion 42 of the fastener 12 and the tool 16, and the tool 16 is disposed in the space 18.

Figure 2:
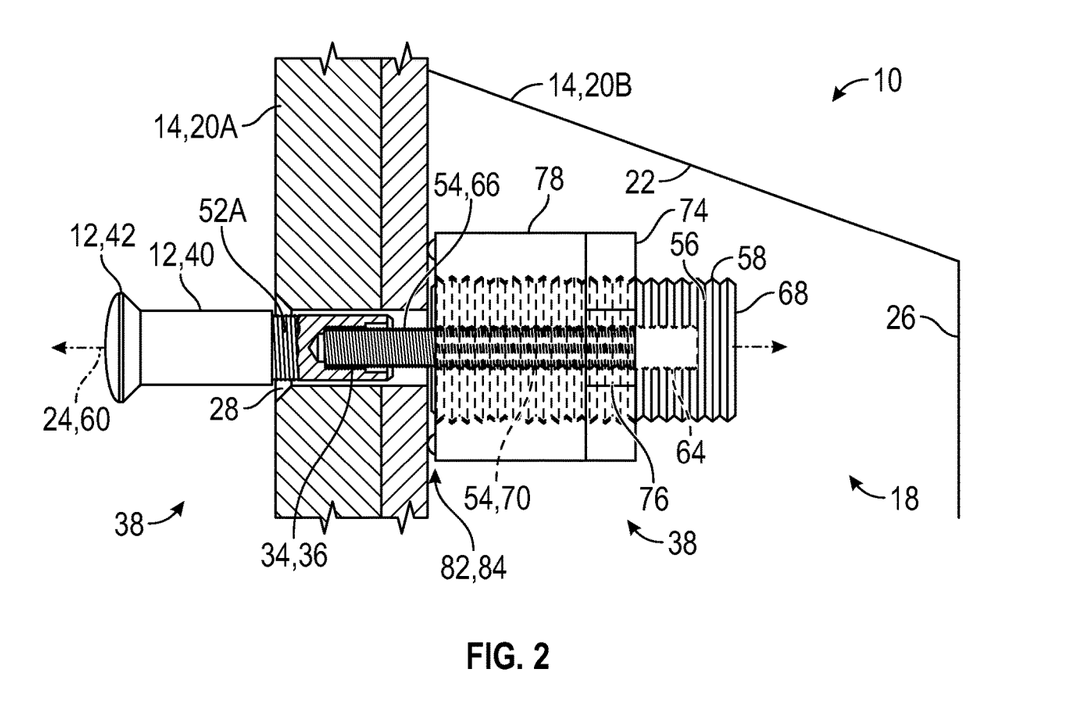
FIG. 2 is a schematic illustration of the workpiece and a tool attached to the fastener prior to beginning an interference fit with the workpiece.
Figure 8:
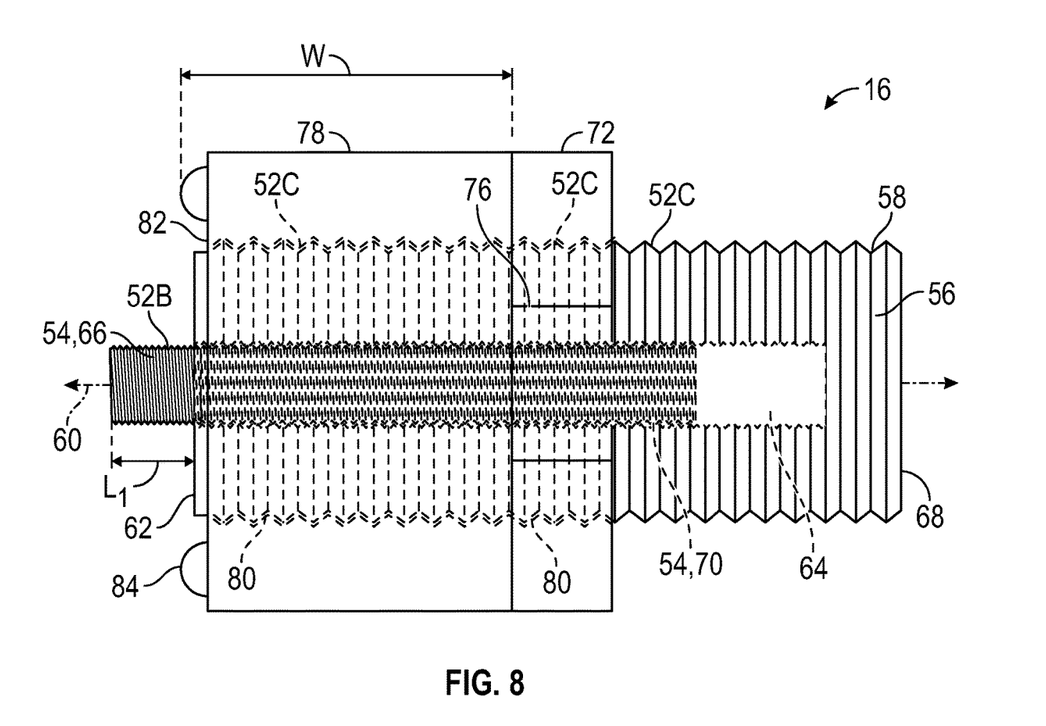
FIG. 8 is a schematic side view of the tool illustrated in FIGS. 2-5.

Referring to FIGS. 2 and 8, the tool 16 includes a tool locking feature 54 that is configured to engage the fastener locking feature 36 to secure together the fastener 12 and the tool 16 in the initial position. Therefore, once the tool 16 is positioned inside the space 18, the tool 16 may be secured to the fastener 12. In certain configurations, the tool 16 is threaded to the fastener 12 to secure together the fastener 12 and the tool 16. More specifically, in certain configurations, the fastener locking feature 36 and the tool locking feature 54 are configured to be threaded together to secure the tool 16 and the fastener 12 together when the fastener 12 is in the initial position. As such, in certain configurations, the fastener locking feature 36 and the tool locking feature 54 each includes threads 52B. It is to be appreciated that the threads 52B of the fastener locking feature 36 and the tool locking feature 54 may be right-handed screw threads or left-handed screw threads. It is to also be appreciated that the tool 16 and the fastener 12 may be secured together via other suitable features 36, 54, and other non-limiting examples of the fastener locking feature 36 and the tool locking feature 54 may include a quick connect, one or more tabs, detents, etc.

For the threaded example of the fastener locking feature 36 and the tool locking feature 54, in this configuration, the tool 16 may be rotated relative to the fastener 12 and/or the fastener 12 may be rotated relative to the tool 16. Regardless of whether the tool 16 and/or the fastener 12 is rotated, one may remain stationary or both may rotate in the opposite directions relative to each other. Optionally to secure the tool 16 to the fastener 12 at this point, the tool 16 may be hand-turned by the installer.

Once the tool 16 is secured to the fastener 12, the tool 16 may operate to pull the fastener 12 into a desired position. That is, the tool 16 is operable to pull the fastener 12 farther through the aperture 28 into the interference fit with the workpiece 14 in the installed position, and more specifically, in certain configurations, into the interference fit with the first wall 20A in the installed position. More specifically, the fastener 12 is pulled along the first axis 24 toward the second wall 20B to the installed position which creates the interference fit between the body portion 40 of the fastener 12 and the surface 32 inside the aperture 28 of the workpiece 14, such as the first wall 20A and the second wall 20B. The second segment 48 of the body portion 40 is pulled into the aperture 28 to create the interference fit in the installed position. As mentioned above, the transition shoulder 50 may act as a lead-in as the fastener 12 is pulled from the initial position to the installed position.

Turning to FIG. 8, the tool 16 may include a main body 56 having an outer wall 58, and the main body 56 may support the tool locking feature 54. Generally, the tool locking feature 54 protrudes outwardly from the main body 56 along a longitudinal axis 60. When the tool 16 is secured to the fastener 12, the longitudinal axis 60 and the first axis 24 may align with each other as shown in FIGS. 2-5. In certain configurations, when the tool 16 is secured to the fastener 12, the longitudinal axis 60 and the first axis 24 may be coincident or coaxial.

The main body 56 of the tool 16 includes a first end 62 that faces the first wall 20A, and the tool locking feature 54 protrudes outwardly from the first end 62. In certain configurations, the main body 56 includes a bore 64, and the bore 64 may be disposed along the longitudinal axis 60. Generally, the outer wall 58 of the main body 56 is spaced from and surrounds the bore 64.

Again, continuing with FIG. 8, the tool locking feature 54 may include a first portion 66 that protrudes outside of the main body 56. In certain configurations, the first portion 66 protrudes outside of the main body 56 at the first end 62. That is the first portion 66 is not disposed inside the bore 64. The first portion 66 of the tool locking feature 54 is disposed inside the hole 34 of the fastener 12 during installation of the fastener 12. In certain configurations, the first portion 66 and the fastener locking feature 36 are configured to be threaded together within the hole 34 such that the distal end 44 of the body portion 40 engages the first end 62 of the main body 56.

The main body 56 also includes a second end 68 spaced from the first end 62 relative to the longitudinal axis 60. The second end 68 of the main body 56 faces away from the first wall 20A. If the second wall 20B includes the back portion 26, the second end 68 of the main body 56 may face the back portion 26. In various configurations, the bore 64 intersects the first end 62 but not the second end 68, and in other configurations, the bore 64 intersects both the first end 62 and the second end 68 of the main body 56. Simply stated, the bore 64 may be a closed-end bore or a through-hole bore.

Furthermore, the tool locking feature 54 may include a second portion 70 attached to the main body 56 within the bore 64. Therefore, the second portion 70 does not protrude outside of the bore 64 at the first end 62. The second portion 70 supports the first portion 66 of the tool locking feature 54. The bore 64 may be threaded to cooperate with the threads 52B along the second portion 70 of the tool locking feature 54 as best shown FIGS. 3 and 4. The tool locking feature 54 is adjustable relative to the main body 56 to change a length $L_i$ of the first portion 66 that protrudes outside of the main body 56. As such, the tool locking feature 54 is adjustable for different depths of the hole 34 of the fastener 12. Changing the length $L_i$ of the first portion 66 also changes a length of the second portion 70 disposed inside of the bore 64. For illustrative purposes, some of the threads inside of the bore 64 of the main body 56 have been eliminated in FIGS. 2-5 and 8 to more clearly illustrate that the second portion 70 may be spaced from an end of the bore 64, and thus, there is space for axial adjustments of the tool locking feature 54 inside of the bore 64.

In certain configurations, the tool locking feature 54 and the main body 56 may be threaded together within the bore 64; and therefore, rotation of the tool locking feature 54 relative to the main body 56 changes the length $L_i$ of the first portion 66 that protrudes outside of the main body 56. Generally, the tool locking feature 54 is rotatable about the longitudinal axis 60 to change how much of the first portion 66 protrudes from the main body 56. It is to be appreciated that the tool locking feature 54 may be attached to the main body 56 within the bore 64 by any suitable features 36, 54, and other non-limiting examples may include a quick connect, one or more tabs, detents, chucks, pins, etc.

Continuing with FIG. 8, the tool 16 may further include a first ring 72 coupled to the main body 56. Generally, the first ring 72 is rotatable about the main body 56 to apply a torque 74 (see FIG. 3) to the main body 56 which causes the main body 56 and the tool locking feature 54 to move axially relative to the first axis 24 to pull the fastener 12 farther through the aperture 28 to the installed position. The torque 74 applied to the main body 56 causes the main body 56 to move axially relative to the first axis 24 or the longitudinal axis 60 away from the first wall 20A. Therefore, for example, if the second wall 20B includes the back portion 26, the main body 56 moves toward the back portion 26 (which is illustrated by comparing the location of the main body 56 in FIGS. 2-4) as the torque 74 is applied to the main body 56 via the first ring 72.

The first ring 72 may surround the outer wall 58. The first ring 72 applies the torque 74 to the main body 56 through the outer wall 58. In certain configurations, the first ring 72 is threaded to the outer wall 58, and thus, rotation of the first ring 72 about the main body 56 causes the main body 56 and the tool locking feature 54 to rotate together about the longitudinal axis 60 due to the threaded connection; and this rotation also translates into axial movement of the main body 56 and the tool locking feature 54 relative to the first axis 24 (which pulls the fastener 12 farther through the aperture 28 to the installed position). As such, the first ring 72 is rotatable about the longitudinal axis 60 to apply the torque 74 to the main body 56, which causes the main body 56 to spin out away from the first wall 20A. The first ring 72 may include a plurality of flats 76, etc., for a wrench, etc., to engage to rotate the first ring 72. The wrench may enter the space 18 via the access point 30.

Referring to FIGS. 2-4 and 8, the tool 16 may include a second ring 78 coupled to the main body 56. The second ring 78 is configured to engage the workpiece 14 to counter the torque 74 applied to the main body 56 via the tool 16 as the fastener 12 moves to the installed position. That is, the second ring 78 generally acts as a reaction surface for the torque 74 being applied via the first ring 72. Furthermore, the second ring 78 may be a thrust bearing or any other suitable component to counter the torque 74 applied to the main body 56.

Continuing with FIGS. 2-4 and 8, the first ring 72 and the second ring 78 abut each other. The first ring 72 abuts the second ring 78 to maintain the second ring 78 into engagement with the workpiece 14 as the torque 74 is being applied to the main body 56. The second ring 78 may surround the outer wall 58. Therefore, the first ring 72 and the second ring 78 may both surround the outer wall 58.

In certain configurations, the second ring 78 is threaded to the outer wall 58 of the main body 56. For example, as best shown in FIG. 8, the outer wall 58 of the main body 56, the first ring 72, and the second ring 78 each include threads 52C, and thus, the first ring 72 and the second ring 78 may be threaded to the outer wall 58 of the main body 56. The threads 52C of the first ring 72 and the second ring 78 are disposed inside an opening 80 of a corresponding one of the first ring 72 and the second ring 78. It is to be appreciated that the threads 52C of the main body 56, the first ring 72, and the second ring 78 may be right-handed screw threads or left-handed screw threads. For illustrative purposes, some of the threads inside of the opening 80 have been eliminated in FIGS. 3-5 to more clearly illustrate movement of the main body 56 inside of the opening 80 and/or to more clearly illustrate movement of the body portion 40 of the fastener 40 entering the opening 80.

Referring to FIG. 8, the second ring 78 includes a width W axially along the longitudinal axis 60. In certain configurations, the width W of the second ring 78 is sized to maintain engagement with the main body 56 when the installed position is reached so that the main body 56 does not detach from the second ring 78. In certain configurations, the width W of the second ring 78 may be different from the first ring 72, as shown in FIG. 8. In other configurations, the width W of the second ring 78 may be the same as the first ring 72 or smaller than the first ring 72.

Generally, the second ring 78 includes an end feature 82, 84 disposed between the first wall 20A and the first end 62 of the main body 56 such that the main body 56 is spaced from the first wall 20A. The end feature 82, 84 shields and/or protects the workpiece 14 from the tool 16. Therefore, for example, the end feature 82, 84 may assist in preventing marring, scratching, etc., the workpiece 14 during installing of the fastener 12.

In certain configurations, the second ring 78 includes an end surface 82 facing toward the first wall 20A, and the end feature 82, 84 may include the end surface 82. In other words, the main body 56 does not extend beyond the end feature 82, 84 toward the first wall 20A. That is, in certain configurations, the end feature 82, 84 is disposed beyond the first end 62 of the main body 56 such that the first end 62 is recessed behind the end feature 82, 84 (as best shown in FIG. 8).

In addition, in certain configurations, the second ring 78 includes a guard 84 disposed between the workpiece 14 and the end surface 82 to prevent direct engagement of the end surface 82 with the workpiece 14. The guard 84 remains in engagement with the second wall 20B as the first ring 72 applies the torque 74 to the main body 56. The guard 84 may shield and/or protect the workpiece 14, and thus, assist in preventing marring, scratching, etc. of the workpiece 14 during installation of the fastener 12. The guard 84 may be any suitable configuration to prevent direct engagement between the end surface 82 and the workpiece 14. For example, the guard 84 may be a washer, an o-ring, part of the thrust bearing, a ball bearing, a bushing, a cover, etc. Furthermore, the end feature 82, 84 may include the end surface 82 and/or the guard 84.

The present disclosure also provides a method of installing the fastener 12 to the workpiece 14. Again, as mentioned above, the workpiece 14 includes the first wall 20A and the second wall 20B spaced from each other to define the access point 30. The method is generally illustrated in FIGS. 1-5.

Referring to FIG. 1, the fastener 12 is inserted into the aperture 28 of the first wall 20A at the initial position. As mentioned above, the aperture 28 is disposed along the first axis 24. At this point, the tool 16 is not being used, and the fastener 12 is loosely disposed inside the aperture 28 of the workpiece 14.

Next, the tool 16 is inserted into the access point 30 transverse to the first axis 24. Therefore, the tool 16 is positioned inside the space 18. The first portion 66 of the tool locking feature 54 aligns with the hole 34 of the fastener 12. Referring to FIG. 2, the fastener locking feature 36 of the fastener 12 and the tool locking feature 54 of the tool 16 are securing together when the fastener 12 is in the initial position. Here, the fastener 12 and the tool 16 may be secured together by hand tightening. For example, the fastener 12 and/or the tool 16 may be rotated to secure these components together.

Figure 3:
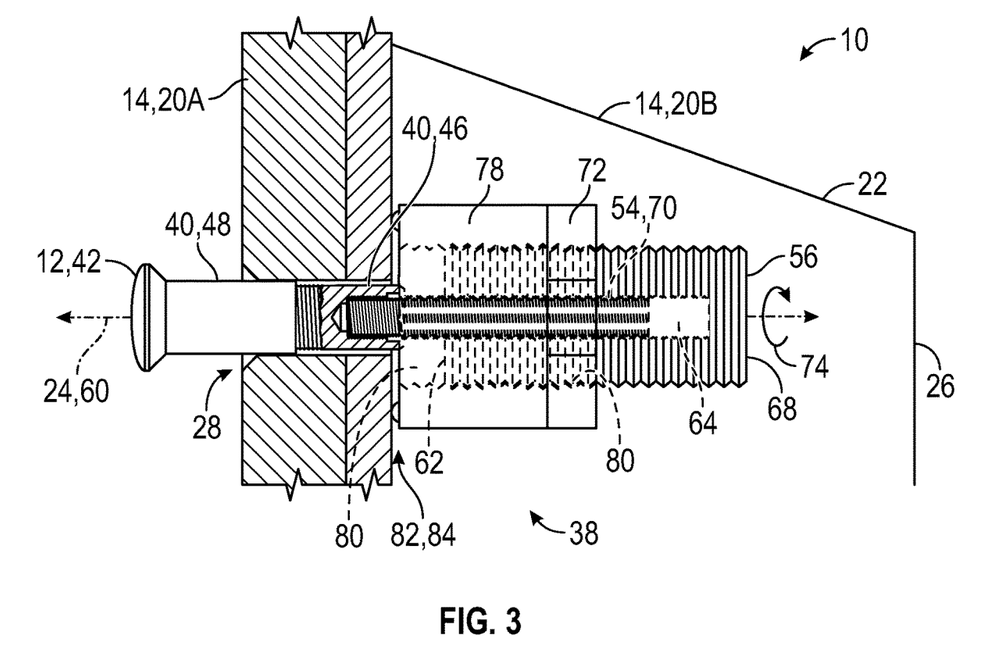
FIG. 3 is a schematic illustration of the workpiece and the tool pulling the fastener toward an installed position.
Figure 4:
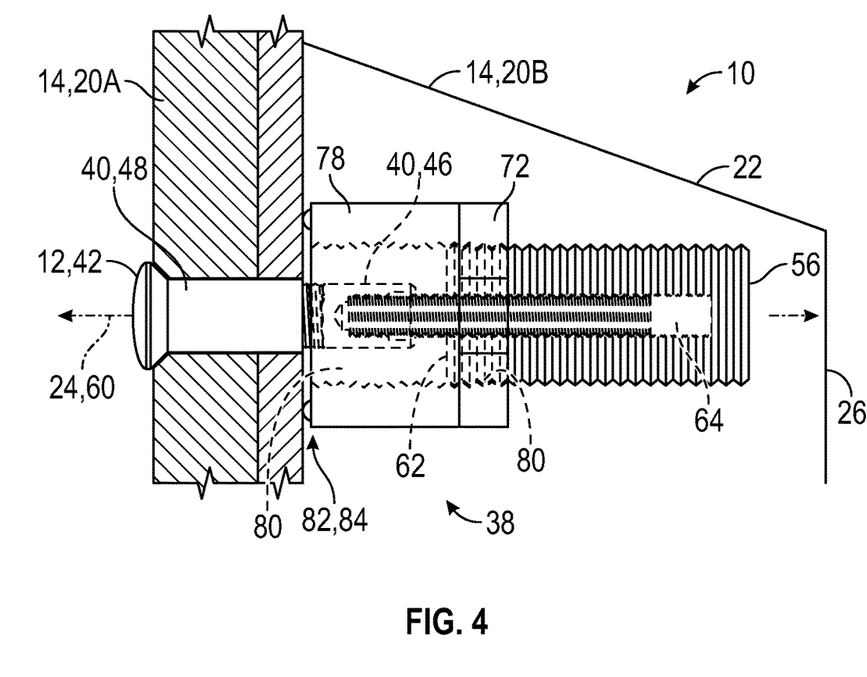
FIG. 4 is a schematic illustration of the workpiece and the fastener disposed in the installed position to complete the interference fit with the workpiece.

Referring to FIGS. 3 and 4, the torque 74 is applied to the tool 16 which pulls the fastener 12 axially along the first axis 24 farther through the aperture 28 into the interference fit with the first wall 20A in the installed position. That is, for example, the wrench may be inserted into the space 18 to engage the flats 76 of the first ring 72; and the wrench may rotate the first ring 72 about the longitudinal axis 60 which causes the main body 56 to rotate relative to the threads 52C and move axially away from the first wall 20A. The axial movement of the main body 56 pulls the fastener 12 axially along the first axis 24 farther into the aperture 28 of the workpiece 14. Due to the second outer diameter $OD_2$ of the second segment 48, the interference fit is created between the surface 32 inside the aperture 28 of the workpiece 14 and the second segment 48. For example, the interference fit may be created via the second segment 48 of the fastener 12 engaging the surface 32 inside the aperture 28 of the first wall 20A of the workpiece 14 and the surface 32 inside the aperture 28 of the second wall 20B of the workpiece 14. The tool 16 continues to apply the torque 74 to the main body 56 until the head portion 42 of the fastener 12 rests against the workpiece 14 in the installed position. As shown in FIGS. 3 and 4, the first segment 46 of the fastener 12 enters the opening 80 inside of the second ring 78 as the main body 56 continues to move axially toward the back portion 26 of the workpiece 14. That is, the first segment 46 of the fastener 12 is surrounded via the second ring 78 as the fastener 12 moves into the installed position.

Figure 5:
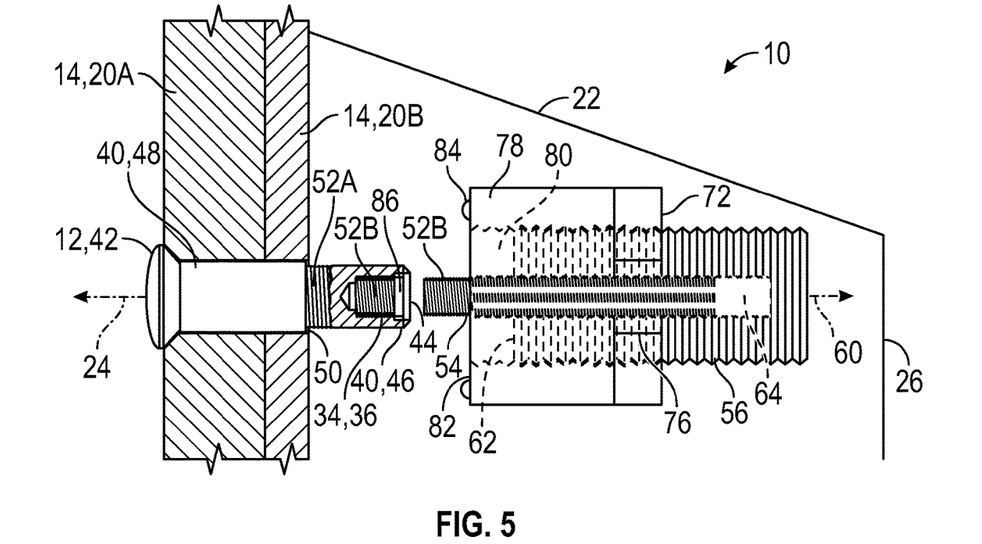
FIG. 5 is a schematic illustration of the workpiece and the fastener disposed in the installed position, with the tool detached from the fastener.

Referring to FIGS. 4 and 5, when the head portion 42 rests against the workpiece 14, the first segment 46 of the fastener 12 is exposed outside of the workpiece 14 and inside the space 18 for the final installation process. Once the fastener 12 is disposed in the installed position, the tool 16 may be separated from the fastener 12. Therefore, the tool locking feature 54 may be unthreaded from the fastener locking feature 36 after the fastener 12 is in the installed position to separate the tool 16 from the fastener 12. At this point, the tool 16 may again be hand-turned, or a wrench may be used.

Referring to FIG. 5, once the tool 16 is separated from the fastener 12, the tool 16 may be removed from the workpiece 14. More specifically, the tool 16 may be removed from the space 18 via the access point 30.

After the tool 16 is removed from the space 18, the nut/collar may be attached to the first segment 46 of the fastener 12 as the final installation process. For final torqueing of the nut/collar to the threads 52A of the first segment 46, the fastener 12 includes a locking feature 86 disposed inside the hole 34 of the fastener 12, as best shown in FIGS. 6 and 7. As such, the locking feature 86 is recessed inside the first segment 46 of the fastener 46 at the distal end 44. This locking feature 86 is configured to compliment the configuration of the nut/collar which prevents the fastener 12 from spinning as the nut/collar is being torqued to the fastener 12. In other words, the nut/collar rotates while the fastener 12 remains stationary during this final installation process. Once the nut/collar is secured to the fastener 12, the first wall 20A and the second wall 20B are secured together, and the installation process is complete.

The locking feature 86 may be disposed between the distal end 44 and the fastener locking feature 36. It is to be appreciated that the locking feature 86 may be in any suitable location along the fastener 12, and the figures are non-limiting examples. For example, the locking-feature 86 may be a configuration that is complimentary to a hex configuration of the nut. It is to be appreciated that the locking feature 86 may be any suitable configuration to compliment the configuration of the nut/collar, and the figures are non-limiting examples.

It is to be appreciated that the order or sequence of performing the method as described herein is for illustrative purposes and other orders or sequences are within the scope of the present teachings. It is to also be appreciated that the method can include other features not specifically discussed in the paragraphs above.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. An installation tool assembly comprising:
 a workpiece including a first wall having an aperture disposed along a first axis, and a second wall spaced from the first wall relative to the first axis to present an access point between the first wall and the second wall;
 a fastener disposed in the aperture of the first wall at an initial position, and the fastener includes a hole and a fastener locking feature disposed inside the hole;
 a tool movable into the access point transverse to the first axis to position the tool relative to the fastener;
 wherein the tool includes a tool locking feature that is configured to engage the fastener locking feature to secure together the fastener and the tool in the initial position, and the tool is operable to pull the fastener farther through the aperture into an interference fit with the first wall in an installed position;
 wherein the tool includes a main body that supports the tool locking feature, and the main body includes a bore;
 wherein the tool locking feature includes a first portion that protrudes outside of the main body and a second portion attached to the main body within the bore; and
 wherein the tool locking feature is adjustable relative to the main body to change a length of the first portion that protrudes outside of the main body.

2. The installation tool assembly as set forth in claim 1 wherein the tool includes a first ring rotatable about the main body to apply a torque to the main body which causes the main body and the tool locking feature to move axially relative to the first axis to pull the fastener farther through the aperture to the installed position.

3. The installation tool assembly as set forth in claim 2 wherein:
 the tool includes a second ring coupled to the main body;
 the first ring and the second ring abut each other; and
 the second ring is configured to engage the workpiece to counter the torque applied to the main body via the tool as the fastener moves to the installed position.

4. The installation tool assembly as set forth in claim 3 wherein:
 the main body of the tool includes a first end that faces the first wall and the tool locking feature protrudes outwardly from the first end; and
 the second ring includes an end feature disposed between the first wall and the first end of the main body such that the main body is spaced from the first wall.

5. The installation tool assembly as set forth in claim 4 wherein:
the fastener includes a body portion and a head portion that protrudes from the body portion;
the body portion of the fastener includes a distal end spaced from the head portion, and the hole is disposed through the distal end;
the first portion of the tool locking feature protrudes outside of the main body at the first end; and
the first portion and the fastener locking feature are configured to be threaded together within the hole such that the distal end of the body portion engages the first end of the main body.

6. The installation tool assembly as set forth in claim 3 wherein the second ring includes an end surface facing toward the first wall and a guard disposed between the workpiece and the end surface to prevent direct engagement of the end surface with the workpiece.

7. The installation tool assembly as set forth in claim 1 wherein:
the fastener includes a body portion and a head portion that protrudes from the body portion; and
the body portion of the fastener includes a distal end spaced from the head portion, and the hole is disposed through the distal end.

8. The installation tool assembly as set forth in claim 7 wherein the fastener locking feature and the tool locking feature are configured to be threaded together to secure the tool and the fastener together when the fastener is in the initial position.

9. The installation tool assembly as set forth in claim 8 wherein:
the main body has an outer wall; and
the tool includes a first ring threaded to the outer wall, and the first ring is rotatable about the main body to apply a torque to the main body which causes the main body and the tool locking feature to move axially relative to the first axis to pull the fastener farther through the aperture to the installed position.

10. The installation tool assembly as set forth in claim 9 wherein:
the tool includes a second ring threaded to the outer wall of the main body;
the first ring and the second ring abut each other; and
the second ring is configured to engage the workpiece to counter the torque applied to the main body via the tool as the fastener moves to the installed position.

11. The installation tool assembly as set forth in claim 7 wherein:
the body portion includes a first segment having a first outer diameter and a second segment having a second outer diameter greater than the first outer diameter to present a transition shoulder between the first segment and the second segment;
the first segment includes the distal end having the hole, and the second segment is disposed between the head portion and the transition shoulder; and
the first segment of the body portion is disposed in the aperture when the fastener is in the initial position, and the second segment of the body portion is pulled into the aperture to create the interference fit in the installed position.

12. The installation tool assembly as set forth in claim 1 wherein the tool locking feature and the main body are threaded together within the bore, and rotation of the tool locking feature relative to the main body changes the length of the first portion that protrudes outside of the main body.

13. A tooling assembly for a workpiece, wherein the workpiece includes an aperture disposed along a first axis and an access point to the aperture, the tooling assembly comprising:
a fastener disposed in the aperture of the workpiece at an initial position, and the fastener includes a hole and a fastener locking feature disposed inside the hole;
a tool movable into the access point transverse to the first axis to position the tool relative to the fastener;
wherein the tool includes a tool locking feature that is configured to engage the fastener locking feature to secure together the fastener and the tool in the initial position, and the tool is operable to pull the fastener farther through the aperture into an interference fit with the workpiece in an installed position;
wherein the tool includes a main body having an outer wall;
wherein the main body includes a bore disposed along a longitudinal axis, and the tool locking feature is attached to the main body within the bore;
wherein the outer wall of the main body is spaced from the bore and the outer wall surrounds the bore radially relative to the longitudinal axis; and
wherein the tool includes a first ring that surrounds the outer wall radially relative to the longitudinal axis.

14. The tooling assembly as set forth in claim 13 wherein the first ring is rotatable about the main body to apply a torque to the main body which causes the main body and the tool locking feature to move axially relative to the first axis to pull the fastener farther through the aperture to the installed position.

15. The tooling assembly as set forth in claim 14 wherein:
the tool includes a second ring coupled to the main body;
the first ring and the second ring abut each other; and
the second ring is configured to engage the workpiece to counter the torque applied to the main body via the tool as the fastener moves to the installed position.

16. The tooling assembly as set forth in claim 13 wherein:
the fastener includes a body portion and a head portion that protrudes from the body portion; and
the body portion of the fastener includes a distal end spaced from the head portion, and the hole is disposed through the distal end.

17. The tooling assembly as set forth in claim 16 wherein:
the body portion includes a first segment having a first outer diameter and a second segment having a second outer diameter greater than the first outer diameter to present a transition shoulder between the first segment and the second segment;
the first segment includes the distal end having the hole, and the second segment is disposed between the head portion and the transition shoulder; and
the first segment of the body portion is disposed in the aperture when the fastener is in the initial position, and the second segment of the body portion is pulled into the aperture to create the interference fit in the installed position.

18. The tooling assembly as set forth in claim 13 wherein:
the tool includes a second ring that surrounds the outer wall of the main body radially relative to longitudinal axis, and the second ring abuts the first ring; and
the first ring is rotatable about the main body to apply a torque to the main body which causes the main body to move axially relative to the longitudinal axis inside of the first ring and the second ring.

19. A method of installing a fastener to a workpiece, wherein the workpiece includes a first wall and a second wall spaced from each other to define an access point, the method comprising:

inserting the fastener into an aperture of the first wall at an initial position, wherein the aperture is disposed along a first axis;

inserting a tool into the access point transverse to the first axis to position the tool relative to the fastener;

securing together a fastener locking feature of the fastener and a tool locking feature of the tool when the fastener is in the initial position, wherein the fastener locking feature is disposed inside a hole of the fastener, wherein a main body of the tool supports the tool locking feature and the main body includes a bore, wherein the tool locking feature includes a first portion that protrudes outside of the main body and a second portion attached to the main body within the bore, and wherein the tool locking feature is adjustable relative to the main body to change a length of the first portion that protrudes outside of the main body; and     applying a torque to the tool which pulls the fastener axially along the first axis farther through the aperture into an interference fit with the first wall in an installed position.

20. The method as set forth in claim 19 further comprising:

unthreading the tool locking feature from the fastener locking feature after the fastener is in the installed position to separate the tool from the fastener; and     removing the tool from the workpiece via the access point.

\* \* \* \* \*